United States Patent [19]

Okamura et al.

[11] Patent Number: 5,503,686
[45] Date of Patent: Apr. 2, 1996

[54] HEAT TREATMENT METHOD FOR THIN FILM MAGNETIC HEAD

[75] Inventors: Yuko Okamura; Keiji Ohkubo; Osamu Saito; Toyoji Ataka, all of Kanagawa, Japan

[73] Assignee: Fuji Electric Co., Ltd., Kawasaki, Japan

[21] Appl. No.: 402,893

[22] Filed: Mar. 13, 1995

[30] Foreign Application Priority Data

Mar. 16, 1994 [JP] Japan .................................. 6-044535

[51] Int. Cl.$^6$ ............................................. C21D 1/04
[52] U.S. Cl. ................................................ 148/108
[58] Field of Search ............................. 148/108; 29/603

[56] References Cited

U.S. PATENT DOCUMENTS

| | | | |
|---|---|---|---|
| 4,928,382 | 5/1990 | Fujiwara et al. | 29/603 |
| 5,168,410 | 12/1992 | Liao | 29/603 |
| 5,214,840 | 6/1993 | Imagawa et al. | 29/603 |
| 5,382,301 | 1/1995 | Ohkubo et al. | 148/108 |

FOREIGN PATENT DOCUMENTS

| | | |
|---|---|---|
| 61-127103 | 6/1986 | Japan .................................. 148/108 |
| 64-68913 | 3/1989 | Japan . |
| 64-68914 | 3/1989 | Japan . |

*Primary Examiner*—John Sheehan
*Attorney, Agent, or Firm*—Christopher R. Pastel; Thomas R. Morrison

[57] ABSTRACT

A magnetic recording head that includes a combined IN element and an MR element is heat treated under two types of magnetic fields. A rotating magnetic field, having a first magnetic field intensity, is applied for a time while the magnetic recording head is at an elevated temperature. Then, part-way during cooling of the magnetic head, the rotating magnetic field is replaced by a direct (non-rotating) magnetic field having a second magnetic field intensity. The second magnetic field intensity is lower than the first magnetic field intensity, whereby the properties of both the IN element and the MR element are maintained at high values.

7 Claims, 3 Drawing Sheets

HEAT TREATMENT METHOD FOR THIN FILM MAGNETIC HEAD

The present invention relates to a heat treatment method for a magnetic read/write head (hereinafter referred to as "magnetic head") used in magnetic recording apparatus such as magnetic disk storage devices etc., and more specifically, the present invention relates to a method for heat treating a soft magnetic thin film of a core of the magnetic head.

Recently, the coercive force of magnetic recording media has been increased to realize higher storage density of the magnetic recording apparatus. This increases the flux densities that must be achieved by a magnetic recording head. Conventional recording heads have employed permalloy materials having saturation magnetic flux density Bs of from about 0.8 to about 0.9. To achieve the required higher flux densities for the new recording media, magnetic heads are being produced using amorphous alloys of the Co family. Such amorphous Co alloys exhibit high saturation magnetic flux density Bs of from about 1.2 to about 1.3, which is required to cope with the higher coercive force of the magnetic recording media.

In amorphous alloys of the Co family, atoms are randomly arranged. Since the atomic arrangement of amorphous alloys of the Co family does not show long range order, the Co family amorphous alloys do not show crystalline magnetic anisotropy that crystalline materials show. However, since the individual crystals of Co inherently have large crystalline magnetic anisotropy, an amorphous alloy with a large anisotropic magnetic field can be produced by growing the Co film in a magnetic field. Due to this, the magnetic permeability of the as-grown Co film grown in a magnetic field is around 600. To improve (increase) the magnetic permeability, the as-grown Co film is heat treated in a rotating magnetic field to reduce the induced anisotropic magnetic field.

On the other hand, magnetoresistance elements (hereinafter referred to as "MR element"), have attracted much attention. The reproduction performance of a recording head using an MR element does not depend on the circumferential speed of the magnetic recording media. MR elements show uniaxial anisotropy. An electrical resistance change is exhibited by an MR element under the influence of magnetization rotation originating in the leakage magnetic field from the recording media. MR elements are usually made of permalloys with uniaxial anisotropy.

For down-sizing of the magnetic storage devices, thin-film magnetic recording heads have been produced with separated recording and reproducing elements. This thin film magnetic recording head combines an MR element with a magnetic induction element (hereinafter referred to as "IN element"). The recording performance of this type of thin film magnetic recording head, especially when used with a recording media of high coercive force, is improved on the recording side by using an IN element made of an amorphous alloy of the Co family.

Referring to FIG. 5a, a magnetic recording head, shown generally at 100, includes an IN element 102 laminated to an MR element 104. A shielding layer 2 is formed on a substrate 1. An insulation layer 3 is formed on the shielding layer 2. A biasing film 5 is formed on insulation layer 3 adjacent a head surface. An intermediate film 6 is formed on the biasing film 5. An MR magnetic pole 7 is formed on the intermediate film 6. An MR electrode 4 is formed over MR magnetic pole 7, and the surface of insulation layer 3, to permit electrical connection to MR magnetic pole 7. An insulation layer 8 is formed on the MR electrode 4.

A coil 11 of IN element 102, protected by an insulation layer 12, is disposed between an under magnetic pole 9 and an upper magnetic pole 10. The surface of the under magnetic pole 9 is laminated to the surface of insulation layer 8. Finally, a protection layer 13 is formed on the outer surface of the upper magnetic pole 10. Arrows in the figure show the magnetic path in the under magnetic pole 9 and the upper magnetic pole 10.

Referring now to FIG. 5b, the shapes of the MR electrode 4, biasing film 5, the intermediate film 6, and the MR magnetic pole 7 are shown. An easy path of magnetization, perpendicular to the magnetic path, is indicated by an arrow EA.

Referring now to FIG. 5c, the shapes of the under IN magnetic pole 9, the upper IN magnetic pole 10, the spiral coil 11, and an IN electrode connected to these constituents are shown. An inter-winding distance of the coil 11 is not indicated in the figure. An easy path of magnetization, perpendicular to the magnetic path is indicated by the arrow EA.

OBJECTS AND SUMMARY OF THE INVENTION

In manufacturing the thin film magnetic head having the above described structure, heat treatment of the MR and the IN elements causes a problem. After the MR element and IN element are formed, the IN element should be heat treated in a rotating magnetic field so as to weaken the uniaxial anisotropy of the Co family amorphous alloy of the IN element to improve the magnetic permeability of the amorphous alloy. On the other hand, the MR element should be heat treated in a direct magnetic field so as to intensify the uniaxial anisotropy of the permalloy of the MR element for improving the magnetoresistance ratio (M R ratio) of the permalloy of the MR element.

If the MR element 104 is heat treated in a direct magnetic field before lamination to the IN element 102, to intensify the MR ratio of the permalloy to its maximum, and then, after lamination, the magnetic recording head 100 is heat treated in a rotating magnetic field to which intensifies the magnetic permeability of the Co family amorphous alloy of the IN element, the concomitant heat treatment of the MR element in the rotating magnetic field randomly orients the anisotropic direction of the Co family amorphous alloy and reduces the MR ratio. In addition to this, the undesired heat treatment of the MR element causes deterioration of the magnetic properties of the MR element including increasing the coercive force by the associated thermal hysteresis.

In view of the foregoing, it is an object of the present invention to provide a heat treatment method for a thin film magnetic head which provides the magnetic material of the MR element with a maximum MR ratio, while treating the magnetic material of the IN element to produce high magnetic permeability.

The above object is achieved by a heat treatment method for a thin film magnetic head including a magnetoresistance element and a magnetic induction element, which comprise the steps of forming the magnetoresistance element and the magnetic induction element; and heat treating the magnetoresistance element and the magnetic induction element consecutively in a rotating magnetic field and in a direct magnetic field.

The above described heat treatment method increases the MR ratio of the MR element by the heat treatment in the direct magnetic field which aligns the anisotropic axis of the magnetic material of the MR element randomly oriented by the heat treatment in the rotating magnetic field, that is which intensifies the anisotropy of the MR element weakened by the heat treatment in the rotating magnetic field, and the high magnetic permeability of magnetic material of the IN element is maintained by decreasing the anisotropic magnetic field by the heat treatment in the rotating magnetic field. Thus, the present heat treatment method facilitates manufacturing magnetic recording heads of separated recording and reproducing type which show high MR ratio and high magnetic permeability.

Briefly stated, the present invention provides a magnetic recording head that includes a combined IN element and an MR element. The magnetic recording head is heat treated under two types of magnetic fields. A rotating magnetic field, having a first magnetic field intensity, is applied for a time while the magnetic recording head is at an elevated temperature. Then, part-way during cooling of the magnetic head, the rotating magnetic field is replaced by a direct (non-rotating) magnetic field having a second magnetic field intensity. The second magnetic field intensity is lower than the first magnetic field intensity, whereby the properties of both the IN element and the MR element are maintained at high values.

According to an embodiment of the invention, there is provided a method for heat treating a thin film magnetic head, of a type including a magnetoresistance element and a magnetic induction element, comprising: forming the magnetoresistance element and the magnetic induction element into the thin film magnetic head, heating the thin film magnetic head in a rotating magnetic field having a first magnetic field intensity, cooling the thin film magnetic head toward ambient temperature, removing the rotating magnetic field at a time during one of the heating and cooling steps, applying a direct magnetic field at the time, the direct magnetic field having a second magnetic field intensity, continuing cooling the thin film magnetic head toward ambient temperature while maintaining the direct magnetic field thereon.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 5b is a side view of the MR electrode of FIG. 5a.

FIG. 5c is a side view of the IN electrode of FIG. 5a.

DETAILED DESCRIPTION OF THE PREFERRED EMBODIMENT

Figure 5A:
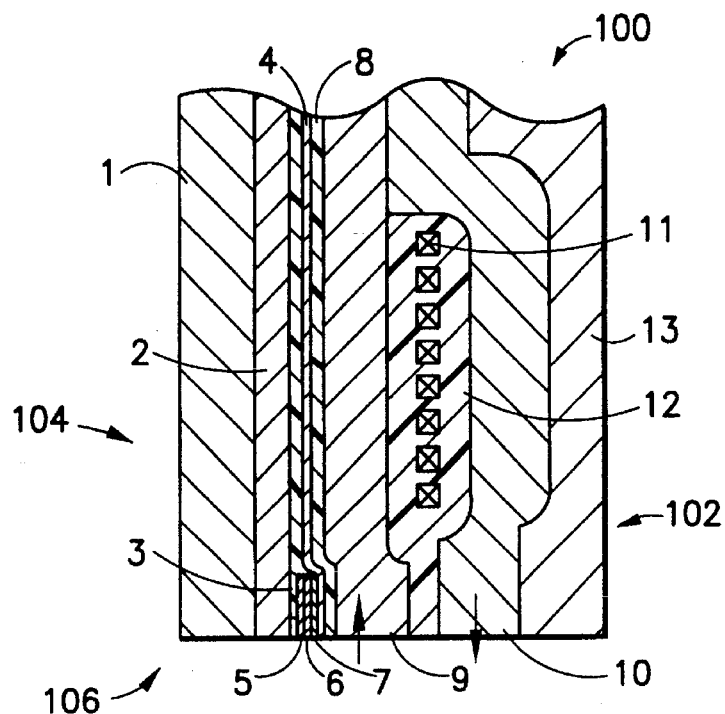
FIG. 5a is a cross section of a magnetic recording head in which the heat treatment method of the present invention is performed.
Figure 5B:
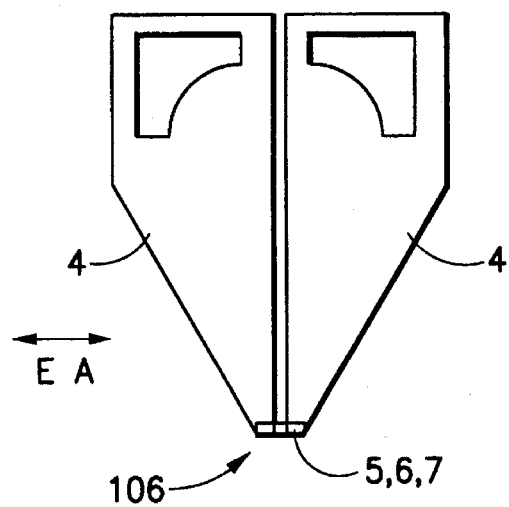

Referring again to FIG. 5a, first the shielding layer 2 is deposited on the substrate 1. Then, the insulation layer 3 is deposited on the shielding layer 2. The biasing film 5, of the Co family amorphous alloy, is deposited on a part of the insulation layer 3 nearest the head surface 106. The intermediate layer 6 of SiAlON is deposited on the biasing film 5. The MR magnetic pole 7 is formed on the biasing film 5. The MR electrode 4 of permalloy is formed over the surfaces of the magnetic pole 7 and the insulation layer 3 by magnetron sputtering. The preceding steps are performed while applying a magnetic field of 170 Oe using permanent magnets positioned on opposed sides of the thus formed thin film lamination including the substrate 1. The conditions for forming the MR thin film lamination are listed in Table 1.

TABLE 1

| | |
|---|---|
| Back pressure | $10^{-6}$ Torr |
| Ar gas pressure | 5 mTorr |
| Substrate temperature | 200° C. |
| Distance between target and substrate | 70 mm |
| RF power | 150 W |
| Film thickness | 40 nm |

Our investigation of the compositions for the permalloy indicates that $Ni_{(100-a-b)}Fe_aCo_b$ ($5 \leq a \leq 25$, $0 \leq b \leq 15$ in weight %) is suitable for obtaining a high MR ratio through the above described process. The MR ratio of the MR thin film lamination comprised of the $Ni_{(100-a-b)}Fe_aCo_b$ is 2%, A conventional photoresist is applied to the surface of the insulation layer 3 and the MR magnetic pole 7. The photoresist is exposed by conventional photo-lithographic techniques to produce a latent pattern corresponding to the MR electrode 4. The latent pattern is cured and etched by, for example, ion beam dry etching, to produce the pattern of the MR electrode 4. A Cu film is deposited in the pattern to produce the MR electrode 4, with its easy axis of magnetization aligned along the longitudinal direction EA of the MR element.

The IN element 102 is fabricated on the insulation film 8. The inventors have discovered that excellent results are obtained using $Co_{(100-X-Y-Z)}Hf_XTa_YPd_Z$ ($3.0 \leq x \leq 4.0$, $4.5 \leq y \leq 5.5$, $1.3 \leq z \leq 3.3$ in atomic %) for the magnetic material of the magnetic poles 9 and 10. This $Co_{(100-X-Y-Z)}Hf_XTa_YPd_Z$ meets the requirements of high saturation magnetic flux density, high heat resistance, high magnetic permeability, and low magnetostriction.

The IN element is formed in a manner similar to the that used in forming the MR element, except that the film lamination for the IN element is conducted in a magnetic field of 120 Oe applied by permanent magnets positioned on opposed sides of the thin film layers laminated so far including the substrate 1. The weaker magnetic field, (120 Oe compared to 170 Oe used for the MR element), is applied so as not to induce too much uniaxial anisotropy in the IN element.

The temperature of the heat treatment in the rotating magnetic field is raised for improving the magnetic permeability so that the uniaxial anisotropy is induced more strongly in the IN element. The applied magnetic field is set at 120 Oe. Each of the magnetic poles 9 and 10 is laminated with a SiAlON layer (not shown) to avoid lowering of the magnetic permeability by eddy current loss and movement of magnetic domain walls. The conditions for forming the IN thin film lamination are listed in Table 2.

TABLE 2

| | |
|---|---|
| Back pressure | <1 × 10$^{-6}$ Torr |
| Ar gas pressure | 5 mTorr |
| Substrate temperature | 10° C. |
| Distance between target and substrate | 70 mm |
| DC power | 50 W |
| Film thickness  Under pole | 175 nm × 8 layers |
| Film thickness  Upper pole | 250 nm × 8 layers |
| SiAlON layer thickness | 10 nm |

The magnetic permeability of the thus grown IN film lamination is 400.

Figure 5C:
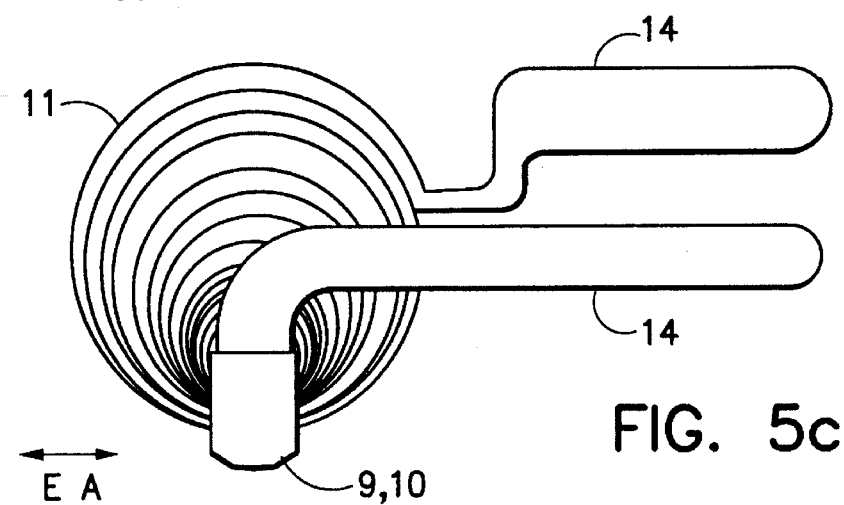

After patterning the under magnetic pole 9 as shown in FIG. 5c, a photoresist pattern is formed on the insulation layer 12 and the Cu film coil 11 is formed. The insulation layer 12 and the upper magnetic pole 10 are deposited. And, finally, the $Al_2O_3$ protection layer 13 is deposited.

According to the present invention, the MR and IN elements formed by the above steps are continuously heat treated in a vacuum chamber (degree of vacuum<1×10$^{-4}$ Torr).

Figure 1:
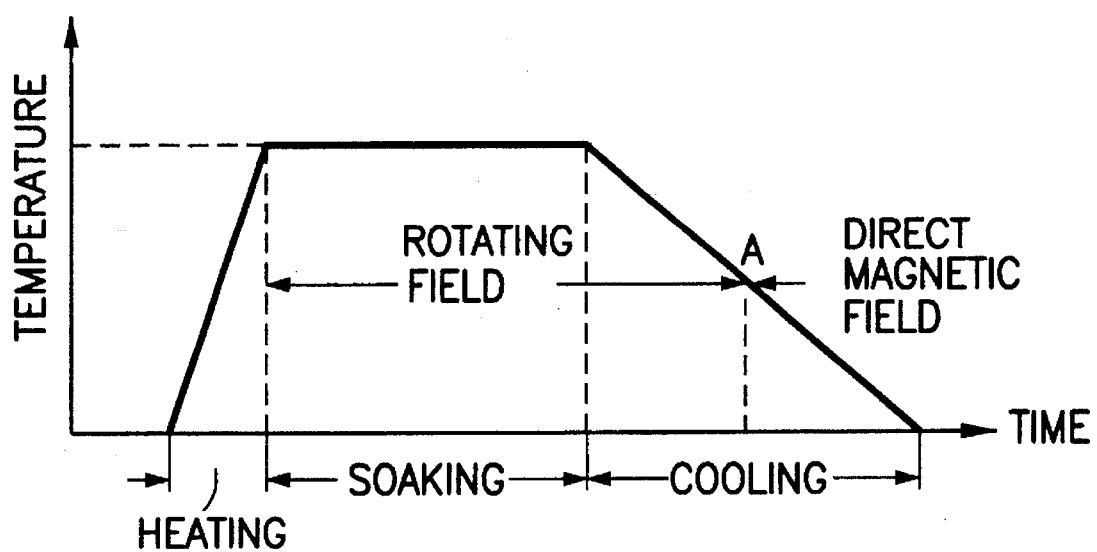
FIG. 1 is a curve showing the magnetic field strength versus time, as the heat treatment process is performed.

Referring to FIG. 1, the progress of the heat treatment time and temperature is shown. The heat treatment process includes three steps: heating, soaking, and cooling. The heating, soaking, and part of the cooling steps are conducted in a rotating magnetic field for improving the permeability of the IN element. Then, at point A, midway during cooling, the rotating magnetic field is changed to a direct magnetic field for aligning the anisotropic axis of the MR element which was previously randomly oriented by the heat treatment in the rotating magnetic field. This final step intensifies the anisotropy of the MR element weakened by the heat treatment in the rotating magnetic field.

It would occur to one skilled in the art that the application of the rotating magnetic field could be delayed until sometime during the soaking step. However, no harm is done by beginning the application of the rotating magnetic field during the heating step.

The temperature, the magnetic field strength, and the application method of the magnetic field were investigated to find the proper conditions.

Figure 2:
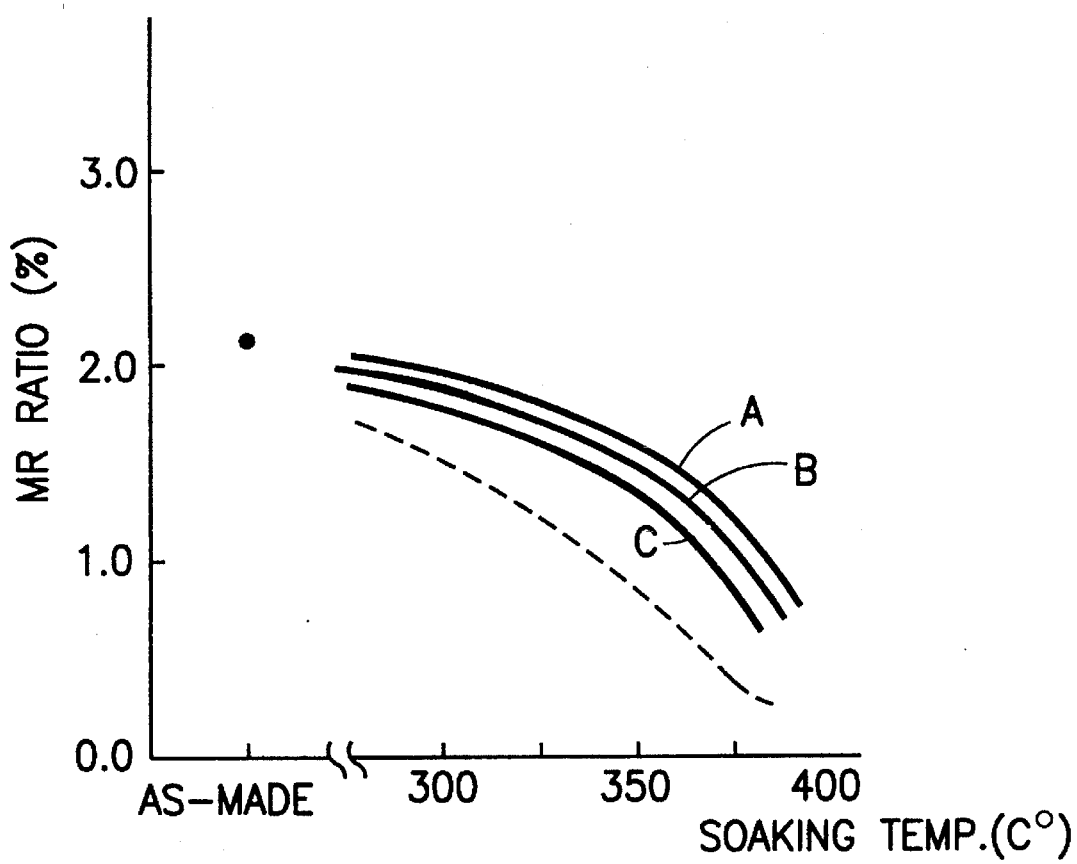
FIG. 2 is a set of curves showing the change in MR ratio versus the soaking temperature during heat treatment, with a change-over temperature as the parameter.

Referring now to FIG. 2, the relationship is shown between the soaking temperature and the MR ratio, with the temperature at which the magnetic field is changed from the rotating to the direct magnetic field (hereinafter referred to as "change-over temperature") as a parameter. For the sake of comparison, the change of the MR ratio of the MR element, subject to the conventional discontinuous double step heat treatment, i.e. the heat treatment in the direct magnetic field after the MR element is fabricated and the treatment in the rotating magnetic field after the IN element is fabricated, is shown by a broken curve. A curve A shows the MR ratio for a change-over temperature of 300° C. A curve B shows the MR ratio for a change-over of 250° C. A curve C shows the MR ratio for a change-over temperature of 200° C. It will be noted that the MR ratio changes with the soaking temperature at which the MR element is heat treated in the rotating magnetic field and with the change-over temperature. According to the present invention, the MR ratio is prevented from lowering more effectively than by the prior art. The present invention suppresses lowering of the MR ratio by applying the direct magnetic field from during midway the cooling process. A higher MR ratio is realized using a lower soaking temperature and a lower change-over temperature.

Figure 3:
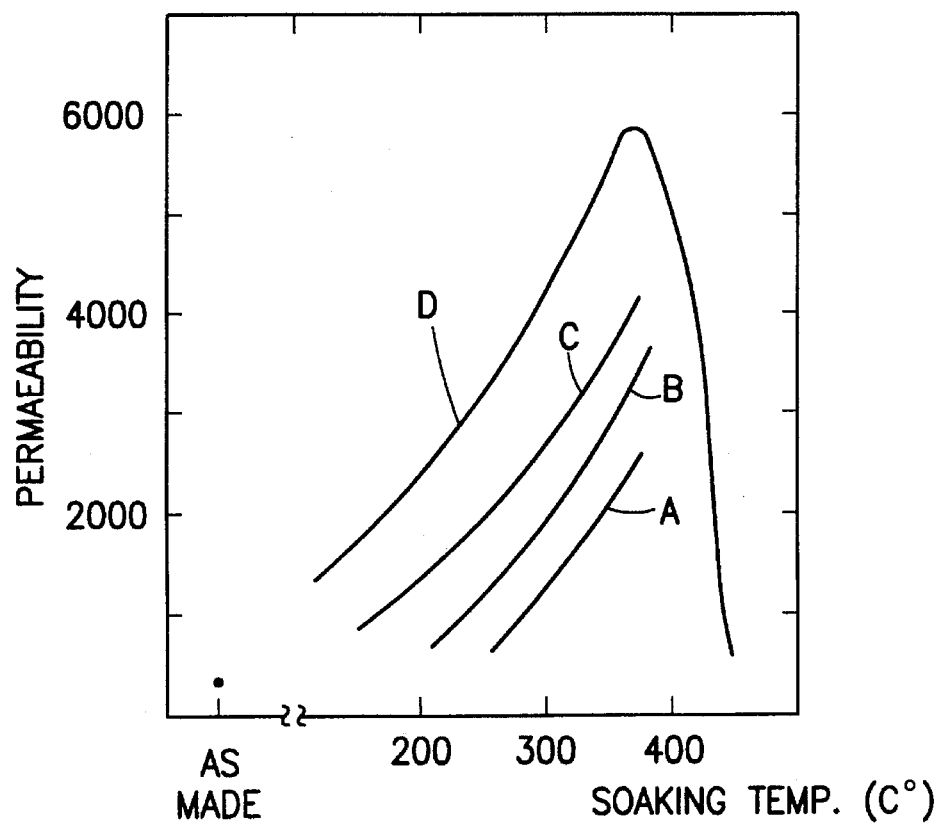
FIG. 3 is a set of curves relating magnetic permeability to soaking temperature, with a change-over temperature as the parameter.

Referring now to FIG. 3, the relationship is shown between the soaking temperature and the magnetic permeability with the change-over temperature as a parameter. A curve A shows the permeability of the IN element for a change-over temperature of 300° C. A curve B shows the permeability for a change-over temperature of 250° C. A curve C shows the permeability for a change-over temperature of 200° c. For comparison, a curve D shows the permeability change of a specimen heat treated only in a rotating magnetic field, with no heat treatment in a direct magnetic field.

From the curves of FIG. 3, it will be noted that the properties of the IN element also change with the heat treatment temperature (soaking temperature) in the rotating magnetic field and with the change-over temperature. One can see that the desirable properties of the IN element and the MR element are in trade-off relation, and a higher change-over temperature makes it difficult to improve the permeability of the IN element.

Figure 4:
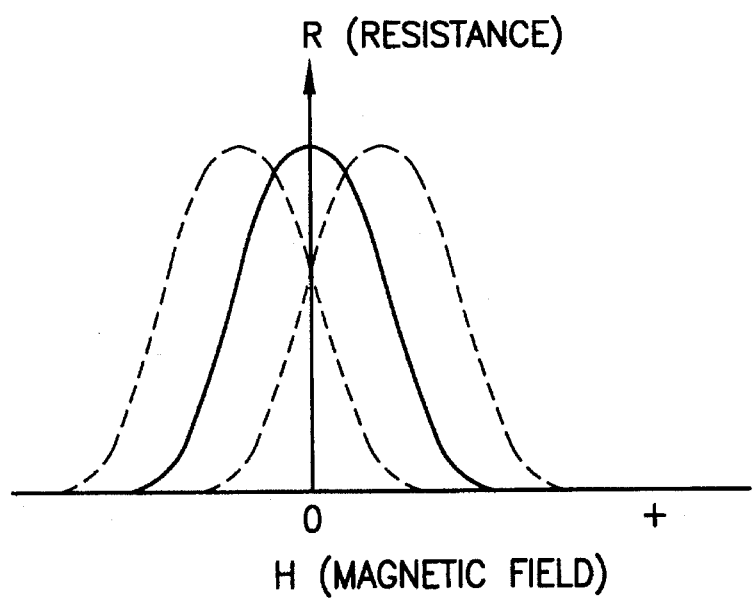
FIG. 4 is a set of curves relating resistance R of an IN element to magnetic field strength H an MR element.

Referring now to FIG. 4, the relationship is shown between the R (resistance) vs. H (magnetic field) of the MR element. In FIG. 4, the dotted curve indicates the R-H relation of the MR element formed using the conventional discontinuous double step heat treatment. The solid line of indicates that the heat treatment method of the present invention, which continuously conducts heat treatment in the rotating magnetic field and the direct magnetic field, is also effective in producing an MR element which shows smaller hysteresis at the same MR ratio.

The heat treatment conditions are selected so as to optimize the MR ratio and the permeability on the basis of the properties of the magnetic materials of the MR element and the IN element.

According to the present invention, the present heat treatment method includes the continuous steps of heating, soaking, and cooling of the previously fabricated MR and IN elements. A rotating magnetic field is applied during the soaking and an early stage of the cooling. The rotating magnetic field is changed over to a direct magnetic field midway during the cooling. By the heat treatment method of the present invention increases the MR ratio of the MR element because of the direct magnetic field which aligns the anisotropic axis of the magnetic material of the MR element randomly oriented by the heat treatment in the rotating magnetic field. The high magnetic permeability of magnetic material of the IN element is maintained by reducing performing the initial heat treatment at a higher temperature during exposure to the rotating magnetic field, and then changing to a direct magnetic field of reduced intensity during part of the cooling cycle. The present heat treatment method, featuring continuous heat treatment and changing of magnetic field application from rotating to direct, and from higher to lower field intensities, facilitates manufacturing magnetic recording heads having separate recording and reproducing elements which show high MR ratio and high magnetic permeability, and eliminates the problem occurring as a result of discontinuous double step heat treatment according to the prior art.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for heat treating a thin film magnetic head, said head including a magnetoresistance element and a magnetic induction element, comprising:

forming said magnetoresistance element and said magnetic induction element into said thin film magnetic head;

heating said thin film magnetic head in a rotating magnetic field having a first magnetic field intensity;

cooling said thin film magnetic head toward ambient temperature;

removing said rotating magnetic field at a time during one of said heating and cooling steps;

applying a direct magnetic field at said time;

said direct magnetic field having a second magnetic field intensity;

continuing cooling said thin film magnetic head toward ambient temperature while maintaining said direct magnetic field thereon.

2. A method according to claim 1, wherein:

the step of heating includes heating toward a soaking temperature, and maintaining said soaking temperature for a substantial time; and said time is a time during the step of cooling said thin film magnetic head.

3. A method according to claim 2, wherein the heating, maintaining and cooling steps are performed continuously, and the steps of removing and applying are performed substantially simultaneously.

4. A method according to claim 1, wherein said second magnetic field intensity is lower than said first magnetic field intensity.

5. A method as claimed in claim 1, wherein the step of forming said magnetic induction element includes forming a layer of an amorphous alloy of $Co_{(100-X-Y-Z)}Hf_X Ta_Y Pd_Z$ ($3.0 \leq y \leq 4.0$, $4.5 \leq y \leq 5.5$, $1.3 \leq z \leq 3.3$ in atomic %).

6. A method as claimed in claim 1 wherein the step of forming said magnetoresistance element includes forming a layer of a permalloy of $Ni_{(100-a-b)}Fe_a Co_b$ ($5 \leq a \leq 25$, $0 \leq b \leq 15$ in weight %).

7. A method as claimed in claim 1 wherein:

the step of forming said magnetoresistance element includes forming a layer of a permalloy, wherein said step of forming said layer of said permalloy further includes applying a first magnetic field;

the step of forming said magnetic induction element includes forming a layer of an amorphous alloy, wherein said step of forming said layer of said amorphous alloy further includes applying a second magnetic field; and said first magnetic field is stronger than said second magnetic field.

* * * * *